(12) United States Patent
Pesce

(10) Patent No.: US 6,338,429 B1
(45) Date of Patent: Jan. 15, 2002

(54) TELEVISION HOLDING DEVICE

(76) Inventor: Barbara A. Pesce, 8514 S New England, Burbank, IL (US) 60459

( * ) Notice: Subject to any disclaimer, the term of this patent is extended or adjusted under 35 U.S.C. 154(b) by 0 days.

(21) Appl. No.: 09/666,916

(22) Filed: Sep. 21, 2000

(51) Int. Cl.[7] .............................. B60R 11/02; B60R 7/04
(52) U.S. Cl. ....................... 224/539; 224/275; 224/568; 296/37.8
(58) Field of Search ................................ 224/275, 539, 224/564, 565, 566, 568; 296/37.6, 37.15; D12/415, 416, 423, 424

(56) References Cited

U.S. PATENT DOCUMENTS

| | | | |
|---|---|---|---|
| 3,304,143 A | * 2/1967 | Connell | |
| 4,371,138 A | 2/1983 | Roberts | |
| 4,383,626 A | 5/1983 | Weinblatt | |
| 4,796,791 A | * 1/1989 | Goss et al. | 224/275 |
| 4,982,996 A | 1/1991 | Vottero-Fin et al. | |
| D328,185 S | 7/1992 | Harry | |
| D351,585 S | * 10/1994 | Scheurer | D12/424 |
| 5,397,160 A | 3/1995 | Landry | |
| 5,664,714 A | 9/1997 | Navarro et al. | |
| 5,725,189 A | * 3/1998 | Landy | |
| D397,083 S | * 8/1998 | Smith | D12/424 X |
| D410,620 S | * 6/1999 | Sacco et al. | D12/423 X |
| D430,535 S | * 9/2000 | Smith | D12/424 X |
| 6,152,514 A | * 11/2000 | McLellen | 296/37.8 |

* cited by examiner

*Primary Examiner*—Gregory M. Vidovich

(57) ABSTRACT

A television holding device for holding a television within a vehicle. The television holding device includes a housing. The housing has a bottom wall, a front wall, a top wall, and a pair of side walls such that a back side of the housing is open. The top wall is in an angular relationship with the bottom wall such that the top wall is angled toward the front wall. An outer surface of the top wall is roughened. A perimeter lip is integrally coupled to and extends upwardly from the top wall. A block portion is integrally coupled to and extends away from the front wall. The block portion has a top surface having a pair of wells extending therein adapted for receiving beverage containers.

6 Claims, 2 Drawing Sheets

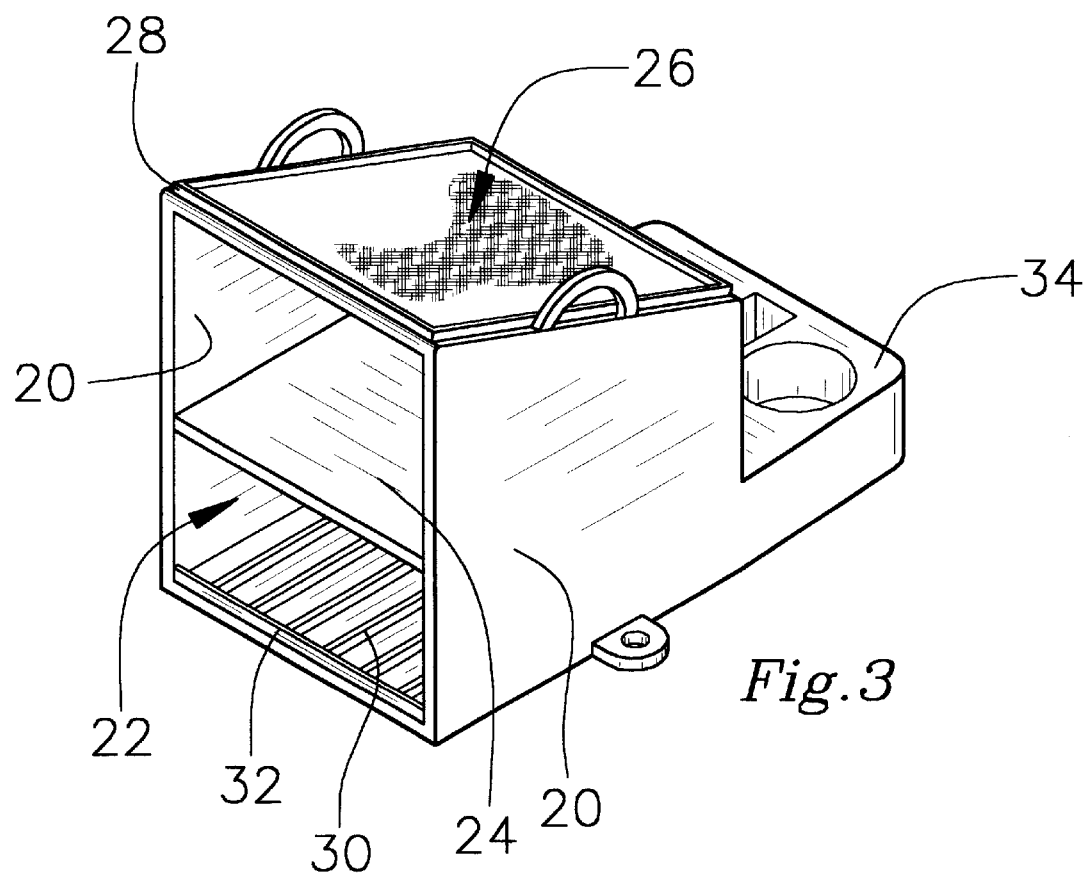
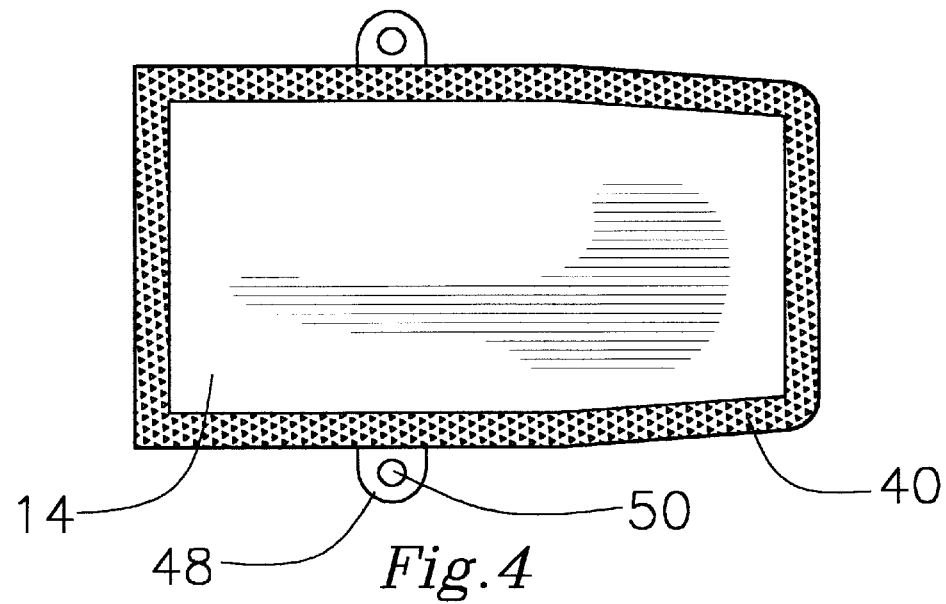

TELEVISION HOLDING DEVICE

BACKGROUND OF THE INVENTION

1. Field of the Invention

The present invention relates to television stands and more particularly pertains to a new television holding device for holding a television within a vehicle.

2. Description of the Prior Art

The use of television stands is known in the prior art. More specifically, television stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,664,714; U.S. Pat. No. 5,397,160; U.S. Pat. No. 4,982,996; U.S. Pat. No. 4,371,138; U.S. Pat. No. 4,383,626; and U.S. Des. Pat. No. 328,185.

While these devices fulfill their respective, particular objectives and requirements, the aforementioned patents do not disclose a new television holding device. The inventive device includes a housing. The housing has a bottom wall, a front wall, a top wall, and a pair of side walls such that a back side of the housing is open. The top wall is in an angular relationship with the bottom wall such that the top wall is angled toward the front wall. An outer surface of the top wall is roughened. A perimeter lip is integrally coupled to and extends upwardly from the top wall. A block portion is integrally coupled to and extends away from the front wall. The block portion has a top surface having a pair of wells extending therein adapted for receiving beverage containers.

In these respects, the television holding device according to the present invention substantially departs from the conventional concepts and designs of the prior art, and in so doing provides an apparatus primarily developed for the purpose of holding a television within a vehicle.

SUMMARY OF THE INVENTION

In view of the foregoing disadvantages inherent in the known types of television stands now present in the prior art, the present invention provides a new television holding device construction wherein the same can be utilized for holding a television within a vehicle.

The general purpose of the present invention, which will be described subsequently in greater detail, is to provide a new television holding device apparatus and method which has many of the advantages of the television stands mentioned heretofore and many novel features that result in a new television holding device which is not anticipated, rendered obvious, suggested, or even implied by any of the prior art television stands, either alone or in any combination thereof.

To attain this, the present invention generally comprises a housing. The housing has a bottom wall, a front wall, a top wall, and a pair of side walls such that a back side of the housing is open. The top wall is in an angular relationship with the bottom wall such that the top wall is angled toward the front wall. An outer surface of the top wall is roughened. A perimeter lip is integrally coupled to and extends upwardly from the top wall. A block portion is integrally coupled to and extends away from the front wall. The block portion has a top surface having a pair of wells extending therein adapted for receiving beverage containers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new television holding device apparatus and method which has many of the advantages of the television stands mentioned heretofore and many novel features that result in a new television holding device which is not anticipated, rendered obvious, suggested, or even implied by any of the prior art television stands, either alone or in any combination thereof.

It is another object of the present invention to provide a new television holding device which may be easily and efficiently manufactured and marketed.

It is a further object of the present invention to provide a new television holding device which is of a durable and reliable construction.

An even further object of the present invention is to provide a new television holding device which is susceptible of a low cost of manufacture with regard to both materials and labor, and which accordingly is then susceptible of low prices of sale to the consuming public, thereby making such television holding device economically available to the buying public.

Still yet another object of the present invention is to provide a new television holding device which provides in the apparatuses and methods of the prior art some of the advantages thereof, while simultaneously overcoming some of the disadvantages normally associated therewith.

Still another object of the present invention is to provide a new television holding device for holding a television within a vehicle.

Yet another object of the present invention is to provide a new television holding device which includes a housing. The housing has a bottom wall, a front wall, a top wall, and a pair of side walls such that a back side of the housing is open. The top wall is in an angular relationship with the bottom wall such that the top wall is angled toward the front wall. An outer surface of the top wall is roughened. A perimeter lip is integrally coupled to and extends upwardly from the top wall. A block portion is integrally coupled to and extends away from the front wall. The block portion has a top surface having a pair of wells extending therein adapted for receiving beverage containers.

Still yet another object of the present invention is to provide a new television holding device that is retrofittable into existing vehicles.

Even still another object of the present invention is to provide a new television holding device that holds a television at an angled relationship with respect to a viewer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention.

FIG. 4 is a schematic bottom view of the present invention.

DESCRIPTION OF THE PREFERRED EMBODIMENT

Figure 1:
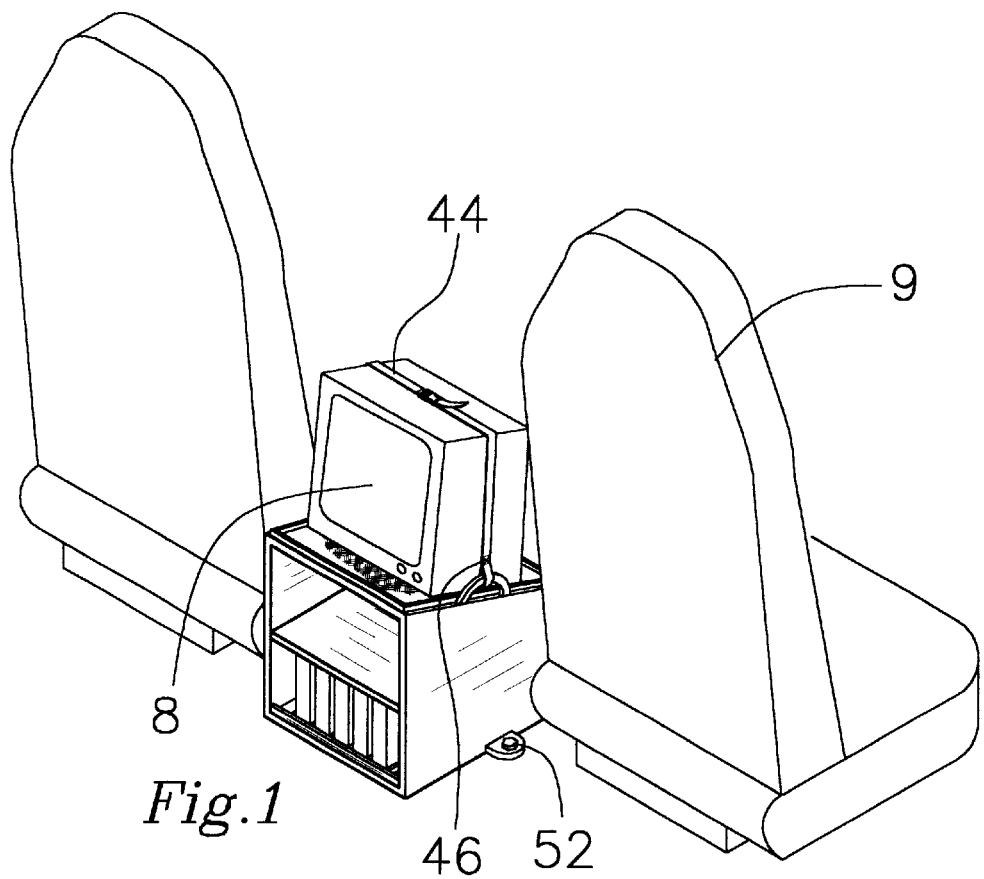
FIG. 1 is a schematic perspective view of a new television holding device according to the present invention.
Figure 2:
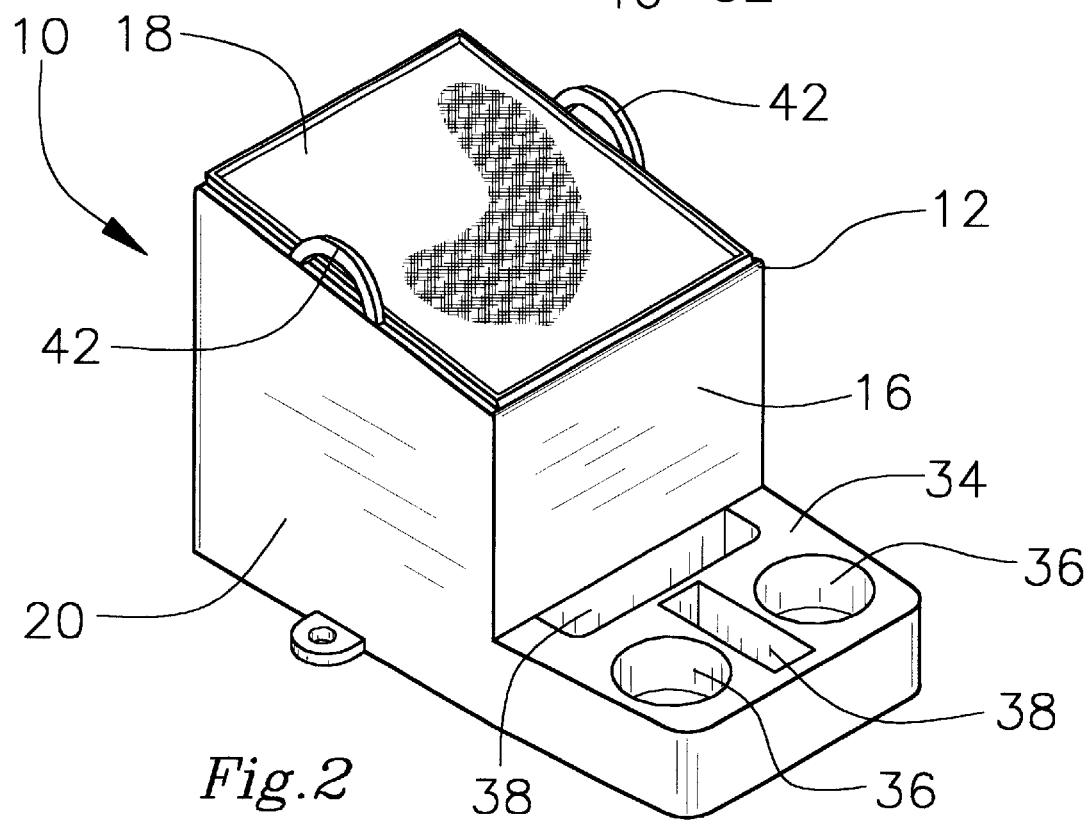
FIG. 2 is a schematic perspective view of the present invention.

With reference now to the drawings, and in particular to FIGS. 1 through 4 thereof, a new television holding device embodying the principles and concepts of the present invention and generally designated by the reference numeral 10 will be described.

As best illustrated in FIGS. 1 through 4, the television holding device 10 generally comprises a housing 12. The housing 12 has a bottom wall 14, a front wall 16, a top wall 18, and a pair of side walls 20 such that a back side 22 of the housing 18 is open. The top wall 18 is in an angular relationship with the bottom wall 14 such that the top wall 18 is angled toward the front wall 16. An intermediate wall 24 is positioned in the housing 12. The intermediate wall 24 extends between and is securely attached to the side walls 20. The intermediate wall 24 is positioned generally between the top 18 and bottom 14 walls and is orientated generally parallel to the bottom wall 14. An outer surface 26 of the top wall 18 is ideally roughened such that a television 8 does not easily slip off of the top wall 18. A perimeter lip 28 is integrally coupled to and extends upwardly from the top wall 18. The bottom wall 14 has a top surface having a plurality of elongate ridges 30 therein. The ridges 30 are spaced and orientated generally parallel to the side walls 20. The distance between adjacent ridges 30 is generally equal to the width of a standard videocassette. A flange 32 is integrally coupled to and extends upwardly from a back edge of the bottom wall 14.

A block portion 34 is integrally coupled to and extends away from the front wall 16. The block portion 34 has a top surface having a pair of wells 36 extending therein. The top surface also has a pair of channels 38 extending therein. The wells 36 have a size adapted for receiving beverage containers and the channels 38 may be used as additional storage space. The bottom wall 14 and the bottom surface of the block portion 34 have a peripheral edge having an elastomeric covering 40 thereon for resisting movement of the device.

Each of a pair of handle members 42 is securely attached to the top wall 18. Each of the handle members 42 is generally positioned adjacent to one of the side walls 20. Each of the handle members 42 is generally U-shaped.

A strapping member 44 straps the television 8 to the top wall 18. The strapping member 44 has a pair of ends 46. Each of the ends 46 is coupled to one of the handle members 42. The strapping member 44 may be positioned over the television 8 when the television 8 is abutted against the top wall 18. Ideally, the strapping member 44 has an adjustable length to accommodate varying sized televisions.

Each of a pair of tab members 48 is securely attached to one of the side walls 20. Each of the tab members 48 is positioned generally adjacent to the bottom wall 14 and each of the tab members 48 has a hole 50 therethrough.

A pair of fastening means 52 removably fastens the device 10 to the vehicle. Each of the fastening means 52 is extendable through one of the holes 50 in the tab members 48. The fastening means 52 are conventional fastening means and preferably comprise screws.

In use, the device 10 is positioned between a pair of chairs 9 in a vehicle so that the back side 22 of the device 10 is facing rearward within the vehicle. A television 8 may be positioned on the top wall 18 and videocassettes may be placed between the intermediate wall 24 and the bottom wall 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A television stand device for removable placement between a pair of seats in a vehicle, said device comprising:
   a housing, said housing having a bottom wall, a front wall, a top wall, and a pair of side walls such that a back side of said housing is open, said top wall being in an angular relationship with said bottom wall such that said top wall is angled toward said front wall, an outer surface of said top wall being roughened, a perimeter lip being integrally coupled to and extending upwardly from said top wall; and a block portion, said block portion being integrally coupled to and extending away from said front wall, said block portion having a top surface having a pair of wells extending therein.

2. The television stand device as in claim 1, wherein said housing further comprises:

an intermediate wall being positioned in said housing, said intermediate wall extending between and being securely attached to said side walls, said intermediate wall being positioned generally between said top and bottom walls and being orientated generally parallel to said bottom wall.

3. The television stand device as in claim 2, wherein said housing further comprises:

said bottom wall having a top surface having a plurality of elongate ridges therein, said ridges being spaced and orientated generally parallel to said side walls, a flange being integrally coupled to and extending upwardly from a back edge of said bottom wall.

4. The television stand device as in claim 1, further comprising:

a pair of handle members, each of said handle members being securely attached to said top wall, each of said handle members being generally positioned adjacent to one of said side walls, each of said handle members being generally U-shaped; and a strapping member for strapping the television to said top wall, said strapping member having a pair of ends, each of said ends being coupled to one of said handle members.

5. The television stand device as in claim 4, further comprising:

a pair of tab members, each of said tab members being securely attached to one of said side walls, each of said tab members being positioned generally adjacent to said bottom wall, each of said tab members having a hole therethrough; and a pair of fastening means for removably fastening said device to said vehicle, each of said fastening means being extendable through one of said holes in said tab members.

6. A television stand device for removable placement between a pair of seats in a vehicle, said device comprising:

a housing, said housing having a bottom wall, a front wall, a top wall, and a pair of side walls such that a back side of said housing is open, said top wall being in an angular relationship with said bottom wall such that said top wall is angled toward said front wall, an intermediate wall being positioned in said housing, said intermediate wall extending between and being securely attached to said side walls, said intermediate wall being positioned generally between said top and bottom walls and being orientated generally parallel to said bottom wall, an outer surface of said top wall being roughened, a perimeter lip being integrally coupled to and extending upwardly from said top wall, said bottom wall having a top surface having a plurality of elongate ridges therein, said ridges being spaced and orientated generally parallel to said side walls, a flange being integrally coupled to and extending upwardly from a back edge of said bottom wall;

a block portion, said block portion being integrally coupled to and extending away from said front wall, said block portion having a top surface having a pair of wells extending therein, said top surface having a pair of channels extending therein;

a pair of handle members, each of said handle members being securely attached to said top wall, each of said handle members being generally positioned adjacent to one of said side walls, each of said handle members being generally U-shaped;

a strapping member for strapping the television to said top wall, said strapping member having a pair of ends, each of said ends being coupled to one of said handle members, wherein said strapping member may be positioned over said television when said television is abutted against said top wall;

a pair of tab members, each of said tab members being securely attached to one of said side walls, each of said tab members being positioned generally adjacent to said bottom wall, each of said tab members having a hole therethrough; and a pair of fastening means for removably fastening said device to said vehicle, each of said fastening means being extendable through one of said holes in said tab members.

* * * * *